(12) United States Patent
Lin et al.

(10) Patent No.: US 9,268,165 B2
(45) Date of Patent: Feb. 23, 2016

(54) TOUCH DISPLAY DEVICE HAVING OPTICAL CLEAR RESIN

(71) Applicants: Yu-Feng Lin, Hsin-Chu (TW); Li-Huang Lu, Hsin-Chu (TW); Chuan-Min Lin, Hsin-Chu (TW)

(72) Inventors: Yu-Feng Lin, Hsin-Chu (TW); Li-Huang Lu, Hsin-Chu (TW); Chuan-Min Lin, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 164 days.

(21) Appl. No.: 14/020,882

(22) Filed: Sep. 8, 2013

(65) Prior Publication Data

US 2014/0085549 A1  Mar. 27, 2014

(30) Foreign Application Priority Data

Sep. 27, 2012  (TW) .............................. 101135570 A

(51) Int. Cl.
*G02F 1/1333* (2006.01)
*G06F 3/041* (2006.01)
*G06F 1/16* (2006.01)

(52) U.S. Cl.
CPC .......... *G02F 1/13338* (2013.01); *G06F 1/1601* (2013.01); *G06F 3/041* (2013.01); *G02F 2001/13332* (2013.01); *G02F 2202/28* (2013.01); *G06F 2203/04103* (2013.01)

(58) Field of Classification Search
CPC .................... G02F 1/3338; G02F 2203/04103; G02F 1/1333; G02F 2001/13332; G02F 2202/28; G06F 3/03547; G06F 1/1601; G06F 2203/04103
USPC .......................................................... 349/12
See application file for complete search history.

(56) References Cited

U.S. PATENT DOCUMENTS

| 8,142,249 B2 * | 3/2012 | Kobayashi et al. ............. 445/24 |
| 2009/0183819 A1 * | 7/2009 | Matsuhira ........................ 156/99 |
| 2010/0245707 A1 | 9/2010 | Harada |

FOREIGN PATENT DOCUMENTS

| CN | 101211049 | 7/2008 |
| CN | 101470291 | 7/2009 |
| CN | 101846834 | 9/2010 |
| CN | 102566808 | 7/2012 |
| CN | 102609140 | 7/2012 |
| JP | 10-254380 | 9/1998 |
| TW | 201040619 | 11/2010 |
| TW | 201042319 | 12/2010 |
| TW | 201107821 | 3/2011 |
| TW | I356087 | 1/2012 |
| TW | 201205149 | 2/2012 |
| TW | 201205156 | 2/2012 |
| TW | I358143 | 2/2012 |
| TW | 201224535 | 6/2012 |
| TW | 201237829 | 9/2012 |

OTHER PUBLICATIONS

'Office Action of China Counterpart Application', issued on Dec. 28, 2015, p. 1-p. 7, in which the listed references were cited.

* cited by examiner

*Primary Examiner* — Paisley L Arendt
(74) *Attorney, Agent, or Firm* — Jianq Chyun IP Office

(57) ABSTRACT

A touch display device including a touch module, a display module, a tape, and an optical clear resin is provided. The display module has a polarizer. The tape is installed between the touch module and the display module, wherein a thickness of the tape is larger than a thickness of the polarizer. The tape surrounds a margin of the display module to form an accommodating space with the polarizer. The optical clear resin is disposed in the accommodating space. The touch module and the display module are adhered to each other by the optical clear resin.

8 Claims, 3 Drawing Sheets

TOUCH DISPLAY DEVICE HAVING OPTICAL CLEAR RESIN

CROSS-REFERENCE TO RELATED APPLICATION

This application claims the priority benefit of Taiwan application serial no. 101135570, filed on Sep. 27, 2012. The entirety of the above-mentioned patent application is hereby incorporated by reference herein and made a part of this specification.

BACKGROUND OF THE INVENTION

1. Field of the Invention

The invention relates to a touch display device, and more particularly, to a touch display device connecting a touch module with a display module by an optical clear resin (OCR).

2. Description of Related Art

Recently, various electronic devices have adopted touch panels instead of conventional keyboards or mice as their input devices. A user can read or input data simply by touching a display screen of such electronic device with their finger.

A connection between the touch panel and the display screen may be achieved by a ring-shaped double-sided tape or an optical clear resin. However, the ring-shaped double-sided tape easily causes a gap between the touch panel and the display screen. Consequently, a light transmittance of a light beam through the gap is reduced, leading to occurrence of ghost images in the electronic device and a lowered quality. Therefore, the optical clear resin increasingly replaces the double-sided tape for connecting the touch panel with the display screen, so that the connection between the touch panel and the display screen achieves full lamination. Generally, the optical clear resin is classified into optical clear adhesive (OCA) in a film shape and the optical clear resin in a liquid state (i.e. OCR).

Regarding the OCR, for example, after the OCR is coated on the touch panel or the display screen, the touch panel and the display screen are adhered to each other, and then the OCR is cured by ultraviolet light irradiated thereon, so that the touch panel and the display screen are connected together. However, during the adhesion process of the touch panel and the display screen, the OCR overflows outside, causing a waste of material, an increase in assembly time, and further, an increase in production cost of the electronic device.

In Taiwan patent application publication Nos. 201040619, 201042319, 201205156, 201205149 and 201107821, Taiwan patent No. 1356087 and 1358143, and Japan patent application publication No. H10-254380, it is disclosed the connection between the touch panel and the display screen by the OCR.

SUMMARY OF THE INVENTION

The invention proposes a touch display device having a structure preventing an optical clear resin (OCR) from overflowing.

Other objectives and advantages of the invention may be further illustrated by the technical features disclosed by the invention.

In order to achieve one of the above purposes, all the purposes, or other purposes, one embodiment of the invention provides a touch display device including a touch module, a display module, a tape and an optical clear resin. The display module has a first polarizer. The tape is installed between the touch module and the display module, wherein a thickness of the tape is larger than a thickness of the first polarizer. The tape surrounds a margin of the display module to form an accommodating space with the first polarizer. The optical clear resin is disposed in the accommodating space. The touch module and the display module are adhered to each other by the optical clear resin.

In the touch display device according to an embodiment of the invention, a difference between the thickness of the tape and the thickness of the first polarizer is in a range of 0.2 mm to 0.3 mm.

In the touch display device according to an embodiment of the invention, the display module further has a liquid crystal panel, a second polarizer, a back cover and a frame. The first polarizer and the second polarizer are installed respectively on a first surface and a second surface of the liquid crystal panel. The back cover surrounds the frame, and the frame supports the liquid crystal panel. The tape is attached to the first surface of the liquid crystal panel.

In the touch display device according to an embodiment of the invention, the tape is attached to the back cover and extends from a top surface of the back cover to a side surface of the back cover connected to the top surface.

In the touch display device according to an embodiment of the invention, the tape further extends to be attached to a bottom surface of the back cover connected to the side surface and opposite to the top surface.

In the touch display device according to an embodiment of the invention, the tape extends from the first surface of the liquid crystal panel to be attached to the first polarizer.

In the touch display device according to an embodiment of the invention, a backlight module is further included to be installed below the liquid crystal panel, wherein the frame surrounds the backlight module and the back cover supports the backlight module.

In the touch display device according to an embodiment of the invention, an opaque layer is further included to be installed on a bottom surface of the touch module, wherein the opaque layer has an opening, and an orthographic projection of the opening on the first surface of the liquid crystal panel defines a display area. An area on the first surface of the liquid crystal panel irradiatable by a curing light defines an irradiatable area, and the tape extends to the irradiatable area but not to the display area.

In the touch display device according to an embodiment of the invention, the tape has an air vent, and the air vent connects the accommodating space to outside.

In the touch display device according to an embodiment of the invention, the tape is a stacked layer, and one layer of the stacked layer is discontinuous in structure to form the air vent.

Based on the above, in the above embodiment of the invention, the tape forms the accommodating space with the first polarizer by the thickness of the tape being larger than the thickness of the first polarizer. Thus, when the optical clear resin (OCR) is disposed in the accommodating space, the optical clear resin is confined in the accommodating space to be prevented from overflowing. Accordingly, assembly time and waste of material associated with the touch display device are reduced, thereby lowering the production cost of an electronic device applying such touch display device.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
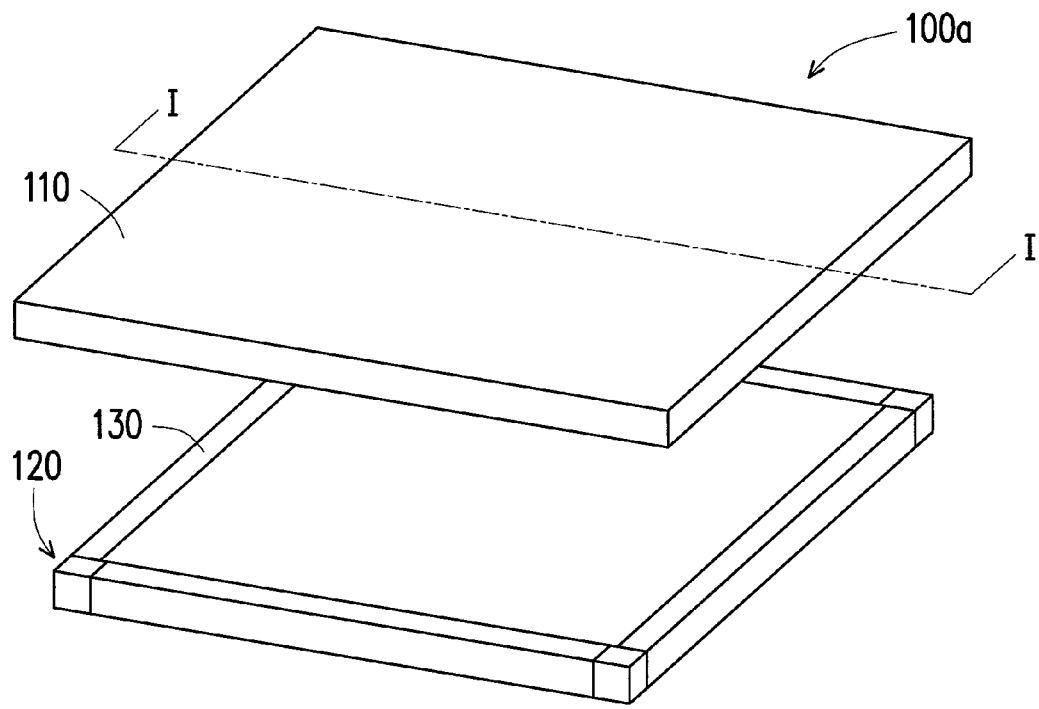
FIG. 1 is a perspective view of a touch display device according to an embodiment of the invention.
Figure 2:
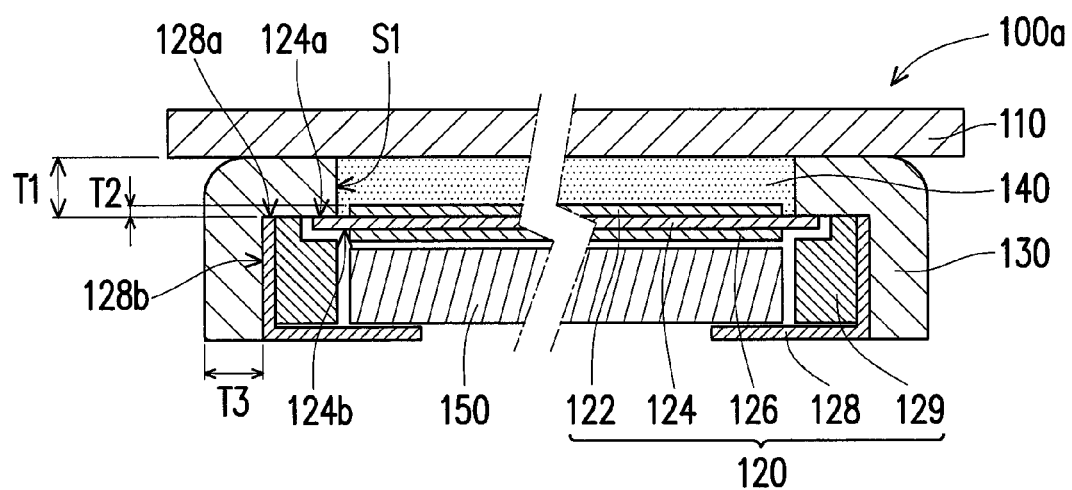
FIG. 2 is a cross-sectional view of the touch display device in FIG. 1 along line I-I after being adhered.

FIG. 1 is a perspective view of a touch display device according to an embodiment of the invention. FIG. 2 is a cross-sectional view of the touch display device in FIG. 1 along line I-I after being adhered. Referring to FIG. 1 and FIG. 2, in the present embodiment, a touch display device 100a is suitable for an electronic device (not illustrated) such as a mobile phone, a notebook computer or a tablet computer. The touch display device 100a includes a touch module 110, a display module 120, a tape 130 and an optical clear resin 140. Here, the optical clear resin 140 is a liquid optical clear resin (i.e. OCR) for exemplary purposes. The optical clear resin 140 is installed between the touch module 110 and the display module 120. After the optical clear resin 140 is irradiated by ultraviolet light, the optical clear resin 140 is cured so that the touch module 110 and the display module 120 are adhered to each other. It is to be noted that for simplifying the diagram, the scale of the touch display device 100a in FIG. 2 has been adjusted.

The display module 120 has a first polarizer 122. The tape 130 is installed between the touch module 110 and the display module 120, wherein a thickness T1 of the tape 130 is larger than a thickness T2 of the first polarizer 122. The tape 130 surrounds a margin of the display module 120 to form an accommodating space S1 with the first polarizer 122. The optical clear resin 140 is disposed in the accommodating space S1. In more detail, after the optical clear resin 140 is coated on the touch module 110 or the display module 120, the touch module 110 and the display module 120 are connected opposing to each other. Since the optical clear resin 140 is confined in the accommodating space S1, the optical clear resin 140 has a limited flowing range so that it does not flow out of the accommodating space S1. Next, after the optical clear resin 140 is irradiated by ultraviolet light and cured, the touch module 110 and the display module 120 are adhered to each other.

Accordingly, an overflow problem of the optical clear resin 140 is avoided as the optical clear resin 140 is prevented from overflowing out of the accommodating space S1 when the touch module 110 and the display module 120 are connected, and a waste of the optical clear resin 140 is also reduced. In addition, when sizes of the touch module 110 and the display module 120 are known, by controlling the thickness T1 of the tape 130, a required amount of the optical clear resin 140 is precisely calculated and controlled, thus reducing the waste of the optical clear resin 140. Moreover, there is no need to spend additional time handling the overflow problem is since no such problem occurs. Therefore, the assembly time of the touch display device 100a is shortened, thus lowering the production cost of an electronic device applying the touch display device 100a.

The tape 130 of the present embodiment is a single-sided tape having adhesion, or a double-sided tape having adhesion, and the invention is not limited thereto. In addition, a difference between the thickness T1 of the tape 130 and the thickness T2 of the first polarizer 122 is, for example, in a range of 0.2 mm to 0.3 mm.

Referring to FIG. 2, the display module 120 of the present embodiment further has a liquid crystal panel 124, a second polarizer 126, a back cover 128 and a frame 129. The first polarizer 122 and the second polarizer 126 are installed respectively on a first surface 124a and a second surface 124b of the liquid crystal panel 124. The back cover 128 surrounds the frame 129, and the frame 129 supports the liquid crystal panel 124. The tape 130 is attached to the first surface 124a of the liquid crystal panel 124. In addition, the touch display device 100a further includes a backlight module 150. The backlight module 150 includes a light source, a plurality of optical films, a light guide plate and a reflector (not illustrated). The backlight module 150 is installed below the liquid crystal panel 124 and is used to provide the liquid crystal panel 124 with the light source, wherein the frame 129 surrounds the backlight module 150 and the back cover 128 supports the backlight module 150. Whether the back cover 128 and the frame 129 are classified as components of the display module 120 or as components of the backlight module 150, it is only a difference in classification, and has nothing to do with actual structures and functions of the back cover 128 and the frame 129. Therefore, in an embodiment of the invention, the back cover 128 and the frame 129 are classified as the components of the backlight module 150, and the backlight module 150 thus includes the light source, the plurality of optical films, the light guide plate, the reflector (not illustrated), the back cover 128 and the frame 129.

Following the above, after a side of the tape 130 is attached to the first surface 124a of the liquid crystal panel 124, another side of the tape 130 is bent relative to the back cover 128 and extends from a top surface 128a of the back cover 128 to a side surface 128b of the back cover 128 connected to the top surface 128a. Accordingly, the components (the first polarizer 122, the liquid crystal panel 124, the second polarizer 126, the back cover 128, the frame 129 and the backlight module 150) of the display module 120 are fixed, and a risk of causing a relative movement between the touch module 110 and the display module 120 is reduced. However, the tape 130 is not limited to being attached to the first surface 124a of the liquid crystal panel 124 and the side surface 128b of the back cover 128. A further description concerning the tape 130 attached to different locations will be provided later. In addition, the thickness of the tape 130 being attached to a side of the first surface 124a of the liquid crystal panel 124 is T1, and the thickness of the tape 130 being attached to a side of the side surface 128b of the back cover 128 is T3. In one embodiment, the thicknesses T1 and T3 of the tape 130 are the same, but in other embodiments, the thicknesses T1 and T3 of the tape 130 may not be the same, and the thickness T3 is smaller than the thickness T1.

In addition, since the frame 129 for supporting the liquid crystal panel 124 and the back cover 128 for supporting the backlight module 150 are fixed by the tape 130, a conventional frame structure is omitted. Therefore, an entire thickness of the touch display device 100a is reduced, facilitating miniaturization of the electronic device.

Figure 3:
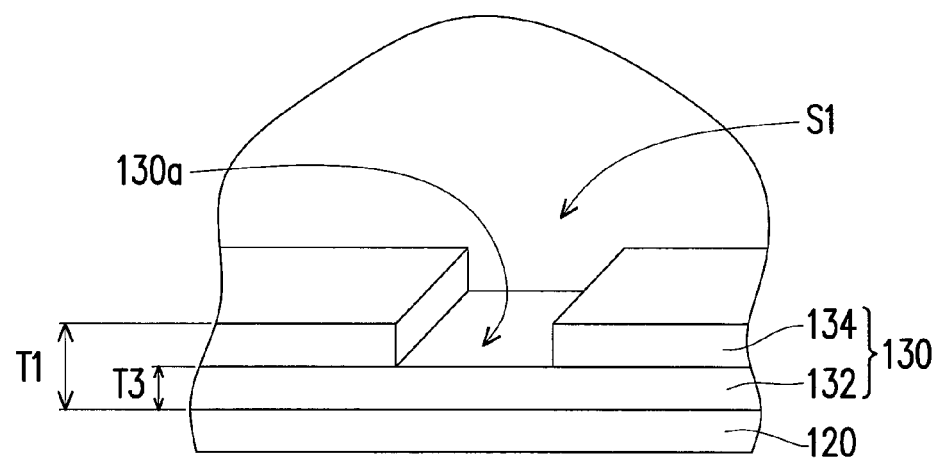
FIG. 3 is a partial perspective view of the tape in FIG. 2.

FIG. 3 is a partial perspective view of the tape in FIG. 2. Referring to FIG. 2 and FIG. 3, the tape 130 has an air vent 130a, and the air vent 130a connects the accommodating space S1 to outside. In more detail, the tape 130 of the present embodiment is a stacked layer formed by a first bonding layer 132 and a second bonding layer 134. The second bonding layer 134 is a discontinuous structure attached to the first bonding layer 132 to form the opening 130a with the first bonding layer 132. Thus, when the optical clear resin 140 is disposed in the accommodating space S1, the air is discharged outside through the air vent 130a, so as to prevent the optical clear resin 140 from having bubbles therein due to remaining air and lowering a display quality of the touch display device 100a. In addition, in cases where the thickness T1 of the tape 130 being attached to a side of the first surface 124a of the liquid crystal panel 124 and the thickness T3 of the tape 130 being attached to a side of the side surface 128b of the back cover 128 are not the same, a thickness of the first bonding layer 132 being stacked with the second bonding layer 134 is, for example, the thickness T1, and the thickness of the first bonding layer 132 is, for example, the thickness T3. However, in other embodiments, the tape 130 is integrally formed. The invention does not limit formation of the tape 130.

Figure 4:
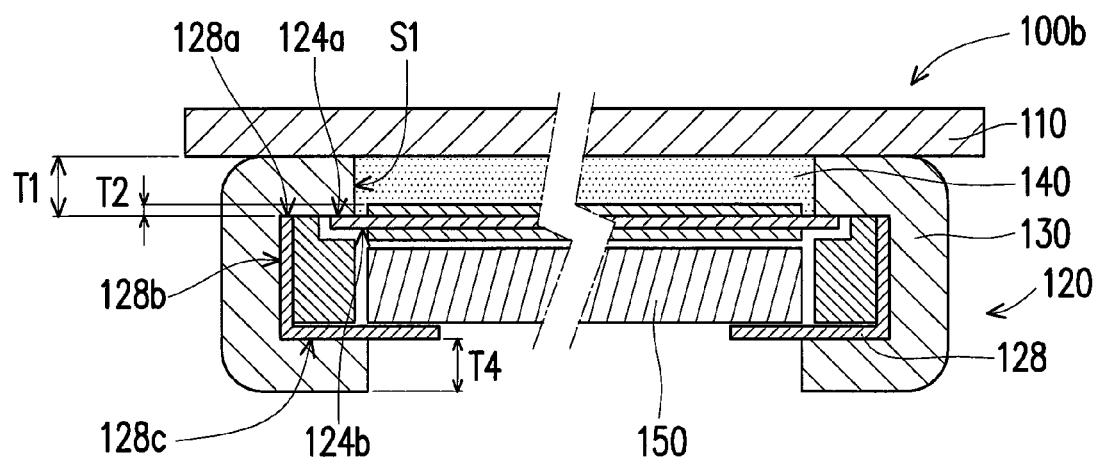
FIG. 4 is a cross-sectional view of a touch display device according to another embodiment of the invention.

FIG. 4 is a cross-sectional view of a touch display device according to another embodiment of the invention. Referring to FIG. 4, a touch display device 100b of the present embodiment is similar to the touch display device 100a in FIG. 2. Only difference between the present embodiment and the embodiment of FIG. 2 will be mentioned. The same or similar reference numbers represent the same or similar elements, and accordingly, no further description thereof will be provided herein.

The tape 130 of the present embodiment further extends to be attached to a bottom surface 128c connected to the side surface 128b of the back cover 128 and opposite to the top surface 128a of the back cover 128. Accordingly, the components (the first polarizer 122, the liquid crystal panel 124, the second polarizer 126, the back cover 128, the frame 129 and the backlight module 150) of the display module 120 are fixed, and the risk of causing a relative movement between the touch module 110 and the display module 120 is reduced. In addition, the thickness of the tape 130 being attached to the bottom surface 128c of the back cover 128 is T4. In the present embodiment, the thicknesses T1 and T4 of the tape 130 are the same, but in other embodiments, the thicknesses T1 and T4 of the tape 130 may not be the same, and the thickness T4 is smaller than the thickness T1. Accordingly, an entire thickness of the display module 120 is reduced, facilitating miniaturization of the electronic device.

Figure 5:
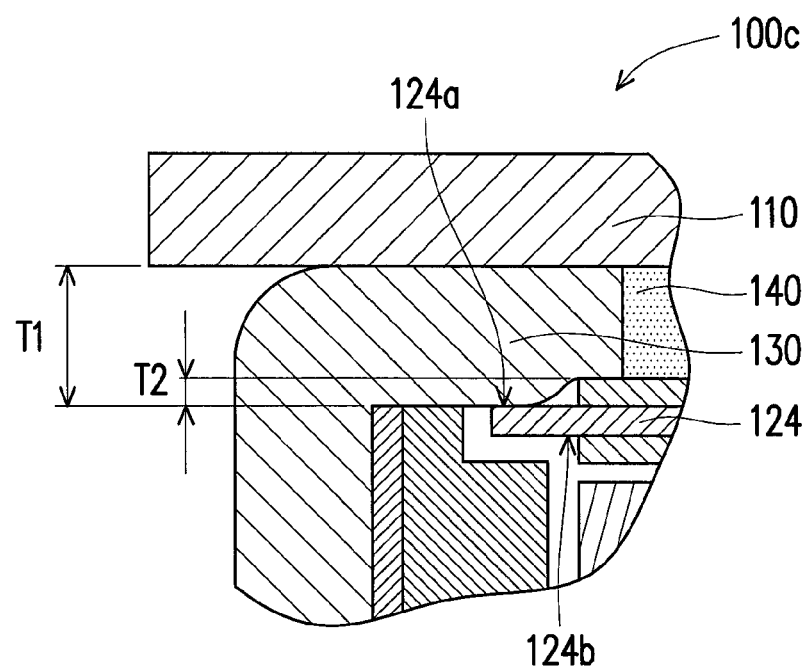
FIG. 5 is a partial cross-sectional view of a touch display device according to still another embodiment of the invention.

FIG. 5 is a partial cross-sectional view of a touch display device according to still another embodiment of the invention. Referring to FIG. 5, a touch display device 100c of the present embodiment is similar to the touch display device 100a in FIG. 2. Only difference between the present embodiment and the embodiment of FIG. 2 will be mentioned. The same or similar reference numbers represent the same or similar elements, and accordingly, no further description thereof will be provided herein.

The tape 130 of the present embodiment extends from the first surface 124a of the liquid crystal panel 124 to the first polarizer 122 and is attached to the first polarizer 122. Accordingly, the components (the first polarizer 122, the liquid crystal panel 124, the second polarizer 126, the back cover 128, the frame 129 and the backlight module 150) of the display module 120 are fixed, and the risk of causing a relative movement between the touch module 110 and the display module 120 is reduced.

Figure 6:
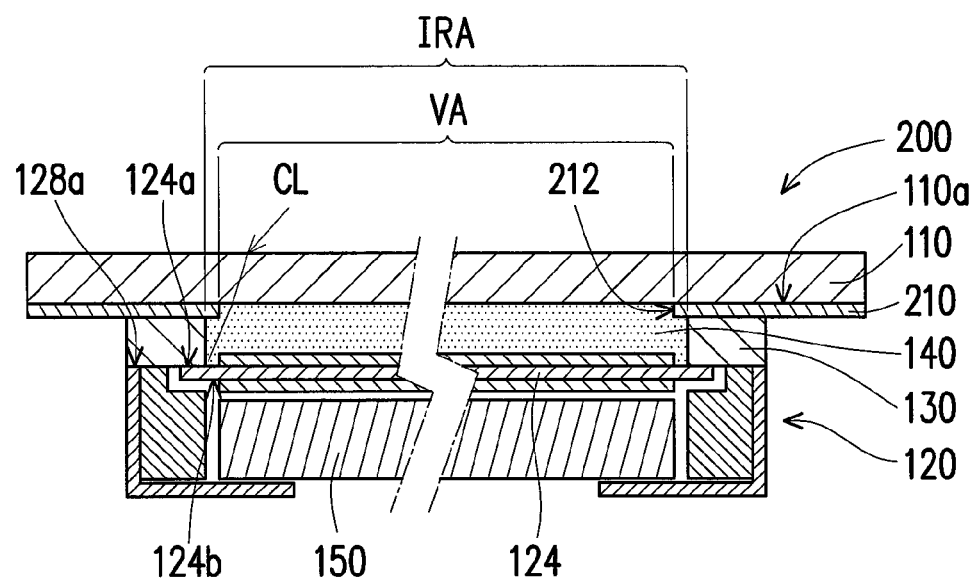
FIG. 6 is a cross-sectional view of a touch display device according to still another embodiment of the invention.

FIG. 6 is a cross-sectional view of a touch display device according to still another embodiment of the invention. Referring to FIG. 6, a touch display device 200 of the present embodiment is similar to the touch display device 100a in FIG. 2. Only difference between the present embodiment and the embodiment of FIG. 2 will be mentioned. The same or similar reference numbers represent the same or similar elements, and accordingly, no further description thereof will be provided herein.

The touch display device 200 of the present embodiment further includes an opaque layer 210. The opaque layer 210 surrounds a margin of the touch module 110 and is installed on a bottom surface 110a of the touch module 110. The opaque layer 210 has an opening 212 exposing a portion of the liquid crystal panel 124. An orthographic projection of the opening 212 on the first surface 124a of the liquid crystal panel 124 defines a display area VA. An area on the first surface 124a of the liquid crystal panel 124 irradiatable by a curing light CL (e.g. ultraviolet light) defines an irradiatable area IRA, and the tape 130 extends to the irradiatable area IRA but not to the display area VA.

In more detail, the curing light CL is irradiated from outside, refracted and enters the touch module 110. The curing light CL passes through the opening 212 of the opaque layer 210 and is refracted to enter the optical clear resin 140. Finally, the curing light CL forms the irradiatable area IRA on the first surface 124a of the liquid crystal panel 124. The irradiatable area IRA is irradiatable by the curing light CL, while an area other than the irradiatable area IRA is not irradiatable by the curing light CL. Since the curing light CL cannot penetrate the opaque layer 210, the optical clear resin 140 in the area other than the irradiatable area IRA cannot be irradiated and cured, and as a result, an adhesion strength between the touch module 110 and the display module 120 is lessened.

In other words, the irradiatable area IRA is the largest irradiation range of the curing light CL after being refracted, wherein a range of the irradiatable area IRA is obtained by calculating parameters such as an incident angle of the curing light CL entering the touch module 110, a refractive index of the air, a refractive index of the touch module 110 and a refractive index of the optical clear resin 140. The display area VA is the largest visible range of the liquid crystal panel 124. With such arrangement, the tape 130 extends to the irradiatable area IRA but not to the display area VA so as to prevent the optical clear resin 140 from overflowing to an outside of the irradiatable area IRA and being unable to be cured. A connection strength between the touch module 110 and the display module 120 after being adhered is accordingly improved.

In summary, the touch display device of the embodiments of the invention at least has one of the following advantages: in the above embodiments of the invention, the tape forms the accommodating space with the polarizer by the thickness of the tape being larger than the thickness of the polarizer. Thus, the flowing range of the optical clear resin is limited by the accommodating space so as to prevent the optical clear resin from overflowing. Accordingly, the waste of the optical clear resin and the assembly time of the touch display device are reduced, thereby lowering the production cost of the electronic device applying the touch display device. In addition, in cases where the touch display device includes the opaque layer, the tape extends to the irradiatable area but not to the display area, improving the connection strength between the touch module and the display module after being adhered.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch display device, comprising:
   a touch module;
   a display module having a first polarizer;
   a tape installed between the touch module and the display module, wherein a thickness of the tape is larger than a thickness of the first polarizer, and the tape surrounds a margin of the display module to form an accommodating space with the first polarizer; and
   an optical clear resin disposed in the accommodating space, the touch module and the display module being adhered to each other by the optical clear resin,
   wherein the display module further has a liquid crystal panel, a second polarizer, a back cover and a frame, the first polarizer and the second polarizer being installed respectively on a first surface and a second surface of the liquid crystal panel, the back cover surrounding the frame, the frame supporting the liquid crystal panel, and the tape being attached to the first surface of the liquid crystal panel,
   wherein the tape is attached to the back cover and extends from a top surface of the back cover to a side surface of the back cover connected to the top surface.

2. The touch display device as claimed in claim 1, wherein a difference between the thickness of the tape and the thickness of the first polarizer is in a range of 0.2 mm to 0.3 mm.

3. The touch display device as claimed in claim 1, wherein the tape further extends to be attached to a bottom surface of the back cover connected to the side surface and opposite to the top surface.

4. The touch display device as claimed in claim 1, wherein the tape extends from the first surface of the liquid crystal panel to be attached to the first polarizer.

5. The touch display device as claimed in claim 1, further comprising:
   a backlight module installed below the liquid crystal panel, wherein the frame surrounds the backlight module and the back cover supports the backlight module.

6. The touch display device as claimed in claim 1, further comprising:
   an opaque layer installed on a bottom surface of the touch module, wherein the opaque layer has an opening, an orthographic projection of the opening on the first surface of the liquid crystal panel defines a display area, an area on the first surface of the liquid crystal panel irradiatable by a curing light defines an irradiatable area, and the tape extends to the irradiatable area but not to the display area.

7. The touch display device as claimed in claim 1, wherein the tape has an air vent, and the air vent connects the accommodating space to outside.

8. The touch display device as claimed in claim 7, wherein the tape is a stacked layer, and one layer of the stacked layer is discontinuous in structure to form the air vent.

* * * * *